Figure 1:
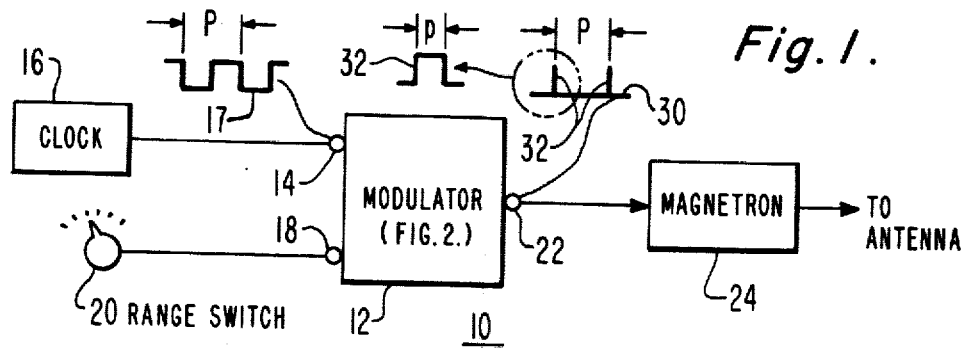

United States Patent [19]

Clock et al.

[11] 4,283,790
[45] Aug. 11, 1981

[54] TRANSISTORIZED MODULATOR FOR PULSE RADAR

[75] Inventors: Donald P. Clock, Granada Hills; Finis C. Easter, Canoga Park, both of Calif.

[73] Assignee: Sperry Corporation, New York, N.Y.

[21] Appl. No.: 44,217

[22] Filed: May 31, 1979

[51] Int. Cl.³ .............................. H04L 27/04
[52] U.S. Cl. ....................... 375/71; 332/9 T; 455/91; 375/73; 343/13 R
[58] Field of Search .............. 375/68, 71, 73; 455/108, 127, 91; 343/7.3, 7, 5, 13 R; 332/9 R, 9 T, 12, 14

[56] References Cited

U.S. PATENT DOCUMENTS

| | | | |
|---|---|---|---|
| 3,449,676 | 6/1969 | Malinowsky | 375/68 |
| 3,667,049 | 5/1972 | Ostroff et al. | 375/71 |
| 3,906,349 | 9/1975 | Harrison | 375/68 |

*Primary Examiner*—Benedict V. Safourek
*Attorney, Agent, or Firm*—Howard P. Terry

[57] ABSTRACT

A modulator for controlling the generation of radio frequency signals in a pulse radar system includes a timer for producing time separated turn-on and turn-off signals and a transistor switch responsive to those signals for controlling the timing of production of the radio frequency signals. In one aspect of the system a signal is applied to the timer to alter the time separation between the turn-on and turn-off signals.

10 Claims, 2 Drawing Figures

TRANSISTORIZED MODULATOR FOR PULSE RADAR

Pulse radar systems employ a modulator to precisely control the time duration of the radio frequency (RF) producing source, typically a magnetron. Conventional radar systems employ a delay line and associated components as the modulator. Such delay lines are costly and bulky and therefore inconsistent with modern digital technology used in other parts of the radar system. A transistorized modulator is therefore desired. In one commercially available radar system, a one shot multivibrator circuit with associated gate means is utilized to turn on to saturation and to turn off a switching transistor which switches on and off a high voltage power supply to the RF producing source.

The turn-off time of a switching transistor in saturation is undesirably long compared to the turn-off time of a transistor operating in the linear region. Further a transistor in saturation has a turn-off time which is a function of its beta and base drive signal whereas in a radar modulator consistent turnoff time is important. It is also desirable in a weather radar system to vary the time duration of the RF signal source. Varying the time duration in a delay line modulator requires complex circuitry. In the aforementioned transistorized modulator no provision is made for varying the time duration.

In accordance with the present invention a transistor switching means controls the time duration of the bias power applied to an RF producing source. A means is included for producing spaced apart turn-on and turn-off signals. Means responsive to the turn-on signal turns on the switching transistor and causes it to operate in a linear region. Means responsive to the turn-off signal forces off the switching transistor. In one aspect of the invention the means for producing spaced apart signals is a timer and there is further included means for controlling the timer to vary the time duration between the turn-on and turn-off signals.

Figure 2:
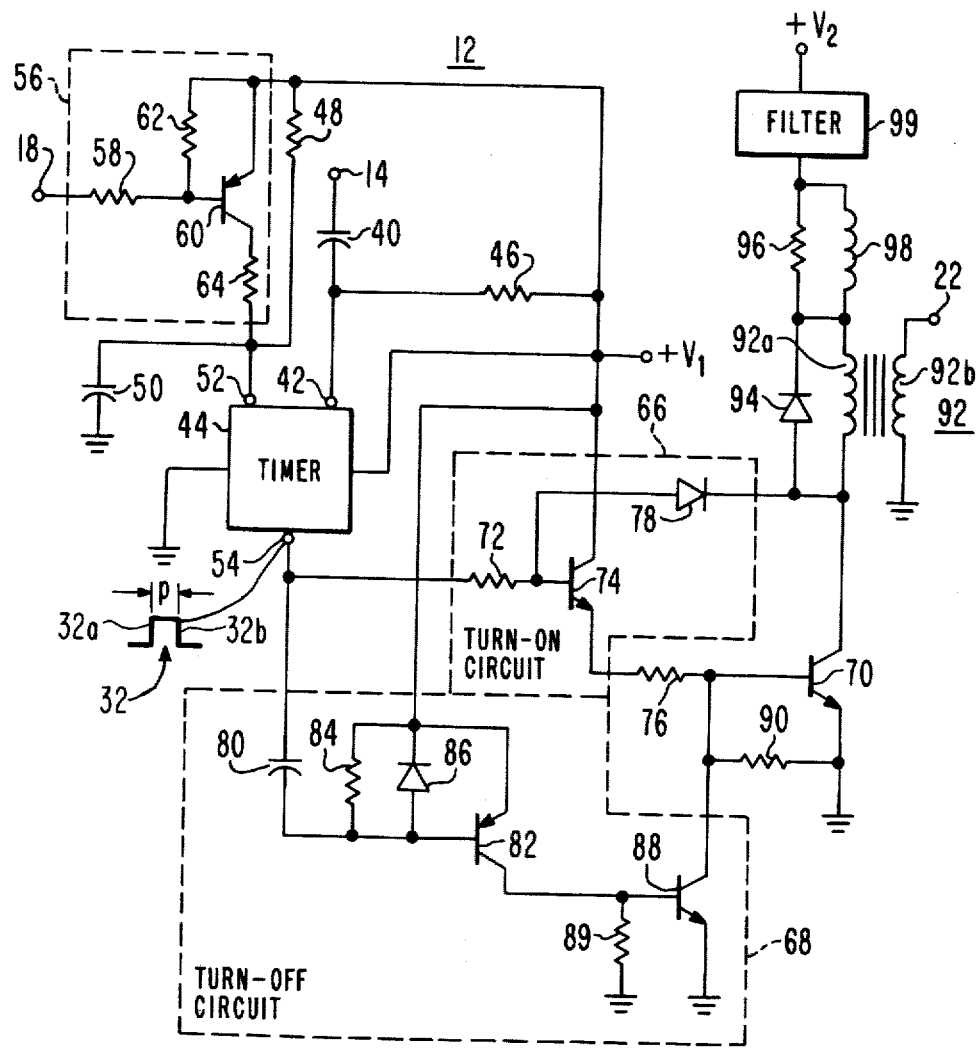

FIG. 1 is a schematic diagram in block form of the transmitter portion of a radar system incorporating the modulator of the present invention; and FIG. 2 is an electrical schematic of a modulator in accordance with the present invention of the type used in the radar system of FIG. 1.

In FIG. 1 a radar transmitter 10 includes a modulator 12 (to be described in detail hereinafter), a conventional source of clock pulses such as a crystal controlled clock 16 connected to terminal 14 of the modulator, a range switch 20 connected to modulator terminal 18 and means producing radio frequency (RF) signals such as a magnetron 24 connected to modulator terminal 22. Magnetron 24 is coupled through conventional circuitry to a conventional radar transmitting antenna (not shown). Range switch 20 is on a radar operator console (which is not shown) and is set by an operator to indicate the maximum range of interest.

Modulator 12 produces, at terminal 22, voltage pulses to provide power to magnetron 24. The pulses 32 illustrated in waveform 30, have a period P and, as illustrated in waveform 32 each pulse has a time duration or pulse width p. The period P is determined by signals produced by clock 16 applied to terminal 14, on the order of milliseconds, is controlled by modulator 12 but can be set to one of several values depending on the setting of range switch 20. Relatively short duration pulses provide better resolution but also result in a low power signal being transmitted by the radar and also therefore in limited range. A relatively long time duration pulse provides lower resolution but produces higher power which is useful for longer radar ranges.

For best accuracy of the radar the shape of the pulses desirably approaches the square wave shape illustrated in waveform 32 and the time duration p of each pulse must be controlled precisely. Also, as mentioned before, p must be adjustable as a function of range of interest to the radar operator. Such precise timing and shaping are formed by the modulator illustrated in FIG. 2.

In FIG. 2, which illustrates the modulator 12 in accordance with the present invention, where terminal numbers correspond to those in FIG. 1, terminal 14 is coupled through capacitor 40 to the trigger terminal 42 of timing means such as a conventional type 555 timer 44. Timer terminal 42 is also connected through resistor 46 to a source bias potential $+V_1$, typically 13 volts.

A time constant circuit comprising resistor 48 and capacitor 50 is connected to terminal 52 of timer 44. The time constant of the circuit connected to terminal 52 determines the time duration p of the pulses produced at timer output terminal 54 of timer 44.

Terminal 18 is connected to a time constant alternation circuit 56 for altering the R-C time constant of resistor 48 and capacitor 50. Circuit 56 includes a transistor switch 60, current limiting resistor 58 connected between terminal 18 and the base of transistor 60, a bias resistor 62 connected between the base of transistor 60 and $+V_1$, a time constant altering resistor 64 connected between the collector of transistor 60 and terminal 52 and a direct connection between the emitter of transistor 60 and $+V_1$. With the proper signal applied at terminal 18 (less than $+V_1$ with a PNP transistor 60 as illustrated), resistor 64 is effectively placed in parallel with resistor 48 lowering the time constant of the signal applied to terminal 52.

Output terminal 54 of timer 44 is coupled to a turn-on circuit 66 and to a turn-off circuit 68 the purposes of which are to turn on and turn off respectively switching transistor 70. Turn-on circuit 66 comprises a current limiting resistor 72 connected between terminal 54 and the base of emitter follower transistor 74. The collector and emitter of transistor 74 are connected respectively to bias supply $+V_1$ and current limiting resistor 76. A voltage limiting diode 78 is connected between the base of transistor 74 and the collector of transistor 70 for the purpose of preventing transistor 70 from going into saturation when rendered conductive by turn-on circuit 66.

Turn-off circuit 68 comprises charge gating capacitor 80 connected between terminal 54 and the base of transmitter 82 which serves as an inverting amplifier. A base return resistor 84 and diode 86 are connected in parallel between the base of transistor 82 and emitter of transistor 82. The emitter of transistor 82 is also connected to bias source $+V_1$ while the collector of transistor 82 is connected to the base of a current sink transistor 88, and to a load resistor 89. The emitter and collector of transistor 88 are connected respectively to circuit ground and to the base or control electrode of switching transistor 70. A resistor 90 connected between the emitter of transistor 70 and the collector of transistor 88 serves to maintain transistor 70 nonconductive when turn-on circuit 66 is not causing transistor 70 to be conductive and turn-off circuit 68 is not forcing off transistor 70. The emitter and collector electrodes of transistor 70 defining its principal current conduction path, are connected respectively to circuit ground and to primary winding 92a of a step up power transformer 92 having a secondary output winding 92b. A high voltage clipping diode 94 is connected across the primary winding 92a. Further, winding 92a is coupled through what is termed an antidroop circuit comprising resistor 96 in parallel with inductor 98 and an R-C filter 99 to a dc source of high voltage bias supply $+V_2$.

Operation of the system of FIG. 1 and circuit of FIG. 2 is as follows. Referring as needed to FIGS. 1 and 2, clock source 16 produces periodic negatively directed pulses 17 each of which triggers timer 44 to produce a pulse of time duration p. The magnitude of p is determined by the R-C time constant circuit (48/50) applied at terminal 52 of timer 44. With transistor 60 nonconductive, such as at a long range sitting of switch 20, the time duration is determined by the values of resistor 48 and capacitor 50 and may, for example, be 10.0 microseconds. With transistor 60 conductive, such as by the short range settings of range switch 20, the time duration of p is determined by resistor 48 and resistor 64 in parallel and by capacitor 50 and, may be, for example, 4.5 microseconds.

The positively directed leading edge 32a of output pulse 32 of terminal 54 causes transistor 74 to become conductive which in turn causes transistor 70 to conduct. Due to the action of diode 78, transistor 70 is not permitted to saturate but rather operates in its linear region. As described below the operation out of saturation is important to the proper turn-off of transistor 70. With transistor 70 conducting, winding 92a is essentially connected between $+V_2$ and circuit ground. As transformer 92 is a step up transformer, a bias voltage pulse greater than voltage $+V_2$ appears at terminal 22 to provide power to magnetron 24.

In the absence of components 96 and 98 the voltage supplied to the transformer 92 may "droop" because of the impedance of filter 99. Further, the voltage at output terminal 22 also droops because of the limited low frequency response of transformer 92. Components 96 and 98 serve to maintain a constant voltage from winding 92b as a function of time considering the relatively short time of about 10 microseconds that transistor 70 is conductive.

The leading edge 32a of each positively directed pulse 32 from timer 44 also charges capacitor 80 to the magnitude of the pulse from the timer 44, which is substantially $+V_1$. At the trailing edge 32b of pulse 32, transistor 74 is made nonconductive and, therefore, transistor 70 would ultimately become nonconductive. However, because of turn-off circuit 68 transistor 70 is forced rapidly to nonconduction as follows.

At point 32b of waveform 32 the voltage at terminal 54 drops to circuit ground whereat the 555 timer 54 is capable of maintaining current. With output terminal 54 of timer 44 at circuit ground capacitor 80 is driven to circuit ground and attempts to ground the base of transistor 82. The base of transistor 82 is however held to the voltage $+V_1$ minus a voltage drop equivalent to the voltage drop across diode 86. Thus, at point 32b of waveform 32 transistor 82 is rapidly made conductive which in turn causes transistor 88 to become conductive. Transistor 88 when conductive acts as a current sink to the base of transistor 70 causing transistor 70 to be rapidly and consistently rendered nonconductive. Since, as mentioned previously, transistor 70, not being saturated, when conductive will consistently and rapidly turn-off at a given time after transistor 88 is made conductive regardless of parametric variations such as transistor beta (current gain) to which transistor 70 is subject. When transistor 70 is turned off, the bias voltage is rapidly turned off at terminal 22. With such rapid turn off the magnetron 24 is precisely controlled thereby controlling the radio frequency spectrum of the pulses it produces.

It will be of course realized that additional circuits such as 56 may be added which are responsive to various setting of range switch 20 to produce different time duration signals to cause a production of different time duration signals by timer 44. These additional circuits 56 will be placed in parallel with resistor 48 and each such circuit will have its own corresponding input terminal and control circuit similar to terminal 18.

Furthermore, the time constant alternation circuit 56 may be modified to change the effective value of capacitor 50 by being connected across the capacitor 50 rather than across resistor 48 as shown in FIG. 2. With such a time constant alteration circuit resistor 64 is replaced by a suitable capacitor.

Timer 44 may be any suitable source of pulses which is capable of producing current at either of the two potential levels produced by the timing device.

What is claimed is:

1. In a pulse type radar, a solid state modulator comprising in combination:
   means producing spaced apart pulses with each pulse of a time duration defined by a leading edge and a trailing edge;
   transistor switch means comprising a transistor, having first and second electrodes defining therebetween the principal current conduction path of its said transistor, and having a third electrode, the potential between its first and third electrodes controlling the conduction of the principal current conduction path of its said transistor;
   means coupled to said third electrode and responsive in sequence to the leading edge of each of said pulses to cause said transistor switch to be made conductive in its linear region;
   means also coupled to said third electrode of said transistor switch and responsive in sequence to the trailing edge of each of said pulses to cause a current flow through said transistor switch third electrode to cause it to become nonconductive;
   means responsive to said transistor switch being conductive for producing a bias voltage signal so long as said transistor switch is conductive; and
   a radio frequency signal producing means responsive to said bias voltage signal to produce a radio frequency pulse of said time duration.

2. In a pulse type radar, a solid state modulator comprising in combination:
   means producing spaced apart pulses each of a predetermined time duration;
   transistor switch means comprising a transistor, having first and second electrodes defining therebetween the principal current conduction path of its said transistor, and having a third electrode, the potential between its first and third electrodes controlling the conduction of the principal current conduction path of its said transistor;
   means coupled to said transistor switch third electrode and responsive to each pulse of said spaced apart pulses to cause said transistor switch to be conductive in its linear region for said time duration;

a voltage supply connected to said transistor switch first and second electrodes to be thereby turned on to produce a power signal voltage so long as said transistor switch is turned on; and a radio frequency signal producing means responsive to said power signal voltage to produce a radio frequency pulse of said time duration.

3. The combination as set forth in claim 1 or 2 wherein said means producing spaced apart pulses comprises timer means and a time constant circuit coupled thereto wherein the value of said time constant determines the pulse width duration of said timer.

4. The combination as set forth in claim 3 further including additional means for selectively altering the time constant of said time constant circuit.

5. The combination as set forth in claim 4 wherein said radar includes a switch for selecting the maximum range of interest thereof and wherein said time constant alteration circuit is responsive to the setting of said range switch for altering said time constant circuit values.

6. The combination as set forth in claim 2 wherein said high voltage bias supply comprises a step up transformer coupled to a source of DC potential and said transistor switch through an antidroop circuit, said antidroop circuit comprising an inductor and resistor in parallel to cause the output of said transformer to produce a constant voltage as a function of time.

7. The combination as set forth in claim 1 or 2 wherein said means for causing said transistor switch to be conductive in its linear region includes a diode means connected between the second and third electrodes of said transistor switch means.

8. In a pulse type radar, a solid state modulator comprising in combination:

means producing spaced apart pulses each of a predetermined time duration;

transistor switch means comprising a transistor, having first and second electrodes defining therebetween the principal current conduction path of its said transistor, and having a third electrode, the potential between its first and third electrodes controlling the conduction of the principal current conduction path of its said transistor;

means for clamping the potential at the third electrode of said transistor switch means to the potential at its second electrode, actuated by the potential at its second electrode approaching that at its first electrode sufficiently close to the end of the range over which the transistor in said transistor switch means operates linearly;

means applying said spaced apart pulses to the third electrode of said transistor switch means for increasing the conduction through the principal conduction path of said transistor sufficiently to cause the potential at said second electrode to approach that at said first electrode sufficiently to actuate said means for clamping;

a voltage supply connected to said transistor switch first and second electrodes to be thereby turned on to produce a power signal voltage so long as said transistor switch is turned on; and a radio frequency signal producing means responsive to said power signal voltage to produce a radio frequency pulse of said time duration.

9. The combination as set forth in claim 8 wherein said means for clamping essentially consists of a diode connected between the second and third electrodes of said transistor switch means and wherein said means applying said spaced apart pulses to the third electrode of said transistor switch means includes a resistor connecting that electrode to said means producing spaced apart pulses.

10. The combination as set forth in claim 1, 2 or 8 wherein said transistor switch means comprises, in addition to said transistor with a base electrode and with emitter and collector electrodes corresponding respectively to the first and second electrodes of said transistor switch means, a further transistor in emitter-follower configuration with an emitter electrode connected to the base electrode of said transistor and with a base electrode corresponding to the third electrode of said transistor switch means.

* * * * *